United States Patent Office 3,686,220
Patented Aug. 22, 1972

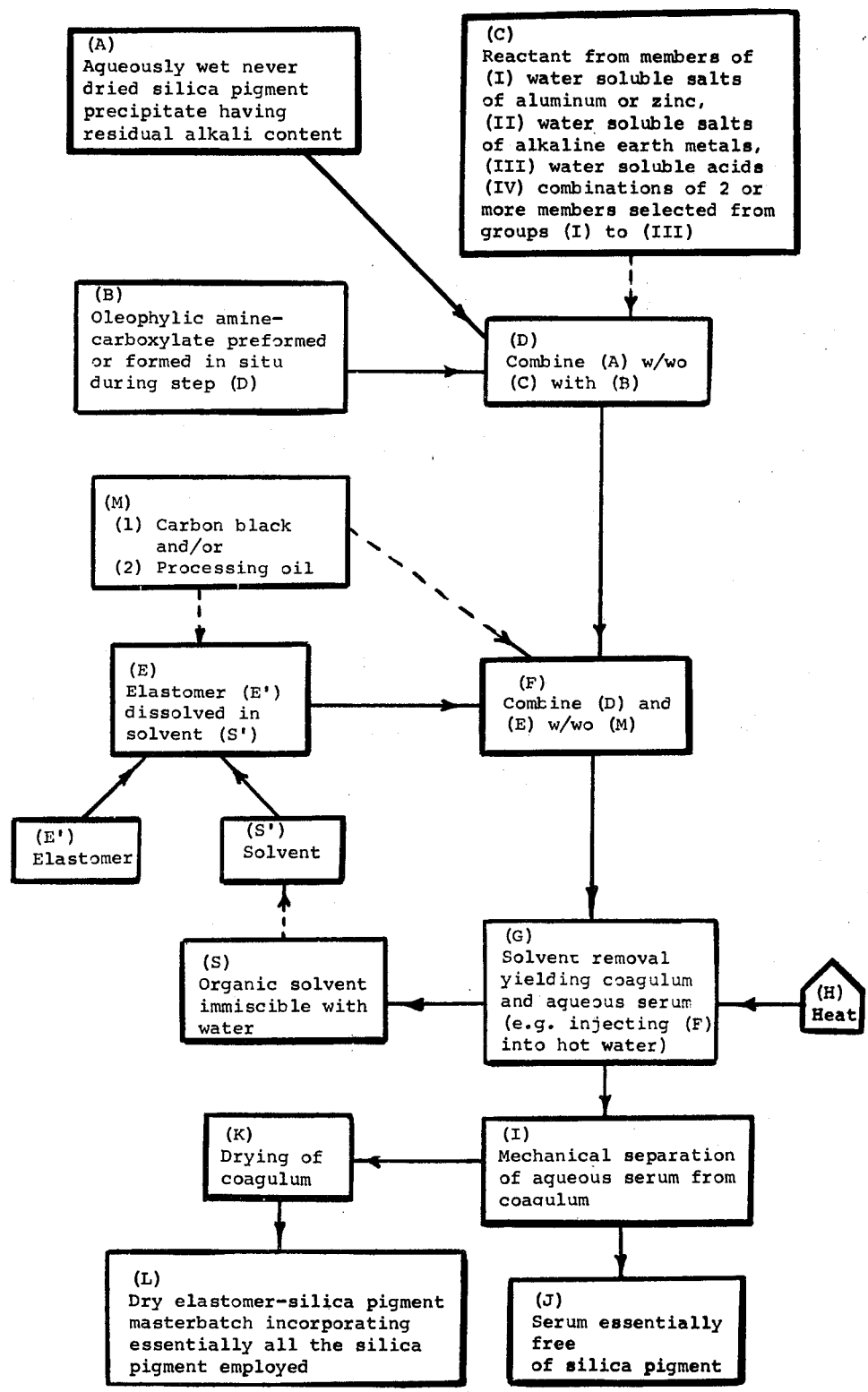

1

3,686,220
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,215, Sept. 16, 1968, which is a division of application Ser. No. 611,250, Jan. 24, 1967, now Patent No. 3,523,096, which is a continuation-in-part of applications Ser. No. 458,379 and Ser. No. 458,420, May 24, 1965, and Ser. No. 479,806, Aug. 16, 1965, now Patent No. 3,401,017. This application July 16, 1970, Ser. No. 55,471
Int. Cl. C07c 11/10; C08d 9/00
U.S. Cl. 260—33.6 AO                 6 Claims

ABSTRACT OF THE DISCLOSURE

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried after its precipitation, with (2) a quantity of oleophilic amine carboxylate material, (3) combining the resulting treated silica pigment slurry with a solvent dispersion of the elastomer, with or without (4) carbon black and/or processing oil and (5) selected reactant, and (b) removing the solvent and aqueous phase and recovering the resulting combination as a masterbatch essentially without loss of silica pigment. The wet pigment may be treated with water soluble salt of aluminum, or zinc, or the alkaline earth metals and/or with water soluble acid, as well as with the said amine carboxylate, and after such treatment the resulting pigment composition may be combined as in (3), (4) and (5) above, and be recovered as in (b) above in the form of a masterbatch.

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. 3,523,096, said application Ser. No. 611,250 having been a continuation-in-part of earlier applications Ser. No. 458,420, filed May 24, 1965, now abandoned; Ser. No. 458,379, filed May 24, 1965, now abandoned; and Ser. No. 479,806, filed Aug. 16, 1965, now U.S. Pat. 3,401,017, the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION (1) Field of the invention

This invention relates to the preparation for the rubber trade of elastomer pigment masterbatches from elastomers and precipitated silica pigments.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses (i.e. the formation of silica gel) and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequtely disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitates having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention, inter alia, provides a simple and efficient process for the curbing of silica pigment losses and the promotion of uniformity of product in the preparation of masterbatches of measured silica pigment content. Briefly, the invention resides in treating never dried wet silica pigment with oleophilic amine carboxylate material and combining the amine carboxylate treated never dried silica pigment with elastomer solution and recovering the masterbatch. As shown in the drawing, the first part of the process consists essentially in:

(A) Providing an aqueous slurry containing 5 to 100 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueous phase without having been dried after its precipitation;

(B) Providing a quantity of from 0.1 to 20% by weight, based on the silica pigment referred to in step (A), of oleophilic amine carboxylate material e.g. from the class consisting of the neutral, basic and acidic carboxylic acid salts of amines wherein at least an amine or a carboxyl group has attached thereto a chain of at least 8 carbon atoms imparting oleophilic properties the compound;

(C) Providing when used in step (D) reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of two or more members selected from Groups (I), (II) and (III);

(D) Combining the wet silica pigment provided by step (A) with reactant material provided in step (C) in an amount in the range of from 0 to at least about a stochiometric equivalent of the alkalinity of the said pigment and then with the oleophilic amine carboxylate material—from (B)—thereby providing a wet silica pigment for use in step (F);

(E) Providing an organic solvent dispersion of the elastomer containing (1) 100 parts of the elastomer by weight, and (2) the solvent of which is essentially water immiscible;

(F) Intimately mixing the solvent dispersion of elastomer—from (E)—with (1) the treated silica pigment slurry—from (D)—(2) from 0 to 75 parts by weight of carbon black—from (M)—with the limitation that the total of silica pigment and carbon black, dry basis, not exceed 75 parts by weight and (3) from 0 to 45 parts by weight of processing oil—from (M)—, and (G) to (J) Removing the solvent and aqueous phase and recovering the resulting combination as a masterbatch, whereby there is formed a masterbatch containing essentially all of the silica pigment employed in step (D).

The elastomer (E') is dissolved in solvent (S')—which may be recycled solvent (S)—to form solution (E) and said solvent itself, or as an azeotrope with water, preferably has a boiling point lower than that of water at atmospheric pressure, and the viscosity of the elastomer-solvent dispersion (i.e. solution) (E) preferably should be selected in the range of 5,000 to 50,000 centipoises to facilitate the intimate blending as at (F), of the elastomer-solvent solution and the slurry of silica pigment treated with oleophilic amine carboxylate, which may be combined therewith in alkaline, essentially neutral, or acidic form as exemplified hereinafter.

In preferred embodiments of the invention, the reactant employed in step (D) may be chosen predominantly from Group (I) or Group (III) and the serum produced is then acidic or alkaline, respectively, and corresponding compounds are contained in the masterbatch; and in further preferred embodiments, the blend (F), and the masterbatch (L) produced therefrom, contains at least 2 parts of carbon black and/or at least 5 parts of processing oil.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

When processing oil and/or carbon black (M) are incorporated at (D) they are most readily introduced after the treatment of the wet silica pigment with (B).

Tht silica-elastomer masterbatch is recovered from the intimately mixed solvent dispersion of elastomer (E) and oleophilic amine carboxylate treated silica pigment slurry (D) and may also include from 0 to 75 parts by weight of carbon black with the limitation that the total of silica pigment and carbon black, dry basis, not exceed 100 parts by weight per 100 parts of elastomer by weight, and/or from 0 to 45 parts by weight of processing oil. Such recovery is effected by separating the volatiles from the coagulum, preferably in two steps (G) and (I), when the solvent or its aqueous azeotrope can be volatilized in step (G) prior to separation of the solids from the remaining aqueous phase in step (I). The volatilizing of the solvent, step (G) to convert the mixture (F) to coagulum and aqueous serum may be effected by running the dispersion (F) into hot water. The greater part of the separation of the coagulum from the aqueous serum in step (I) is preferably effected by mechanical dewatering, e.g. filtration, decanting, centrifuging, etc., to reduce the heat requirement for final drying of the masterbatch. The serum removed by mechanical dewatering is found to be essentially free of silica pigment as indicated at (J) in the drawing and the dry elastomer-silica pigment masterbatch thus incorporates essentially all of the silica pigment employed. The process thus curbs silica losses and assures a uniform silica pigment content in the masterbatch.

DESCRIPTION OF PREFERRED EMBODIMENTS

Preferred embodiments illustrative, but not restrictive, of the invention are set forth in Examples 1 through 25. In these examples the hydrated silica pigment precipitate has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation, and the aqueous silica pigment is combined with various oleophilic amine carboxylates and from 0 to at least a stoichiometric equivalent, based on the alkalinity of the silica pigment slurry, of reagent selected from (I) the water soluble salts of aluminum, zinc and alkaline earth metals, (II) the water soluble acids and (III) combinations thereof.

In these examples the reactants employed were: in Example 1, 5, 9, 11, 13, 18, 19, aluminum sulfate; in Examples 2, 14, zinc sulfate; in Examples 3, 6, 7, 16, 17, 22, 23, sulfuric acid; in Example 8, aluminum sulfate and sulfuric acid; and in Examples 4, 10, 12, 20, 21, no reactant, and in Examples 15, 24, 25, calcium chloride.

In these examples, the combination of elastomer-solvent dispersion and oleophilic amine carboxylate treated silica pigment was prepared by intimate mixing in the high speed, high shear Waring Blendor. The removal of solvent from the intimate mixture of the treated aqueous silica and the rubber-cement was accomplished by injecting the said mixture into boiling water and the volatile solvent readily boiled off leaving a wet coagulum or wet crumb in the aqueous serum, which serum was free of silica or essentially free of silica.

The invention may be employed to improve wet silica-polymer solution masterbatching and masterbatches, using any alkaline slurry of never dried wet silica pigment containing bound alkali, and is applicable to the formation of materbatches therewith with elastomer-organic solvent dispersions, i.e. cements, of all solvent soluble elastomers.

Silica pigments containing residual alkali suitable for masterbatching in accordance with the present invention are usually precipitated by the gradual acidulation of aqueous sodium silicate solution with the aid of carbon dioxide, and in accordance with the preferred embodiments of this invention are continuously maintained in an aqueously wet state without ever having been dried therefrom until incorporated in the mastermatching process.

Elastomers (and solvents)

The elastomers employed in solution in the present invention include, but are not limited to, those prepared in anhydrous solvent systems, e.g. with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention.

In selecting the solvent the more highly volatile hydrocarbon, or halohydrocarbon, or halocarbon solvents are desirable, e.g.: butane, pentane, hexane, cyclohexane, methylene chloride, carbon tetrachloride, and the like.

The solvent cements, dispersions, or solutions employable herein thus include, but are not limited to, the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g. butadiene-styrene, butadiene-acrylonitrile or methacrylonitrile, butadiene-acrylate or methacrylate ester; and rubbery copolymers of hydrocarbon monomers with polar vinylidene (including vinyl) monomers copolymerizable therewith, elastomers from olefins and/or cyclic olefins and/or cyclic diolefins and/or dicyclic diolefins including the ethylene-propylene copolymers, the ethylene-propylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils, herein referred to as oil-rubber-silica masterbatches, and any of the foregoing further including other cooperating ingredients, such as carbon black, providing the silica pigment comprises an essential component thereof, e.g. carbon black-elastomer-silica masterbatch.

The materials designated by the term "oleophilic amine carboxylates," which may be employed in the present invention, are the members of the class consisting of (a) the neutral, basic and acidic carboxylic acid salts of amines, wherein (b) at least one amine group or carboxyl group has attached thereto a long carbon chain of at least 8 carbon atoms imparting oleophilic properties to the compound, which chain may be wholly or partly of linear, branched, cyclic or aromatic configuration and may be attached to but one amine or carboxyl group, or may bridge between two amine groups or between two carboxyl groups, (c) such oleophilic amine carboxylates being derived from precursor amines having from 1 to 10 primary and/or secondary and/or tertiary amine groups and not more than 36 carbon atoms per amine group, and from carboxylic acids having from 1 to 10 carboxyl groups and not over 36 carbon atoms per carboxyl group, and (d) such precursor amines and carboxylic acids having boiling points above the boiling point of water at atmospheric pressure.

The oleophilic amine carboxylates are prepared from (i) precursor amine material and (ii) precursor carboxylic acid material, and provided one of the precursor materials is selected from group (A) compounds and the other precursor material is selected from group (A) compounds or from group (B) compounds.

The Group (A) compounds include:

(A)(i) The precursor amines having from 1 to 10 primary and/or secondary and/or tertiary amine groups and not more than 36 carbon atoms per amine group and having at least one amine group attached to a long chain of at least 8 carbon atoms and not more than 36 carbon atoms as aforesaid.

(A)(ii) The precursor carboxylic acids having from 1 to 10 carboxylic acid groups and not more than 36 carbon atoms per carboxylic acid group and having at least one carboxyl group attached to a long chain of at least 8 carbon atoms and not more than 36 carbon atoms as aforesaid.

The Group (B) compounds include:

(B)(i) The precursor amines having 1 to 10 primary and/or secondary, and/or tertiary amine groups and no chain of more than 7 carbon atoms attached to any amine group, and said amines having their boiling point above the boiling point of water at atmospheric pressure.

(B)(ii) The precursor carboxylic acids having 1 to 10 carboxyl groups and no chain of more than 7 carbon atoms attached to any carboxyl group and said carboxylic acids having their boiling points above the boiling point of water at atmospheric pressure.

Group (A)(i) amines are exemplified by the following (1) Long-chain primary amines represented by the formula $R-NH_2$ in which R contains from 8 to 36 carbon atoms and includes but is not limited to octyl amine, decyl amine, dodecyl amine, tetradecyl amine, hexadecyl amine, octadecyl amine, palmitoleyl amine, oleyl amine, linoleyl amine, linolenyl amine, the mixed primary amines derived from fatty oils such as coco amine, soybean amine, tallow amine, rosin amine, and partially or completely hydrogenated amines derived from the above unsaturated amines, and the like;

(2) Long-chain secondary amines having at least a single alkyl substituent containing from 8 to 36 carbon atoms, e.g. long-chain secondary amines represented by the formula

in which R contains from 8 to 36 carbon atoms and R' contains from 1 to 36 carbon atoms, and includes but is not limited to dioctyl amine, didecyl amine, didodecyl amine, ditetradecyl amine, dihexadecyl amine, dioctadecyl amine, dipalmitoleyl amine, dioleyl amine, dilinoleyl amine, dilinolenyl amine, the mixed secondary amines derived from fatty oils such as dicoco amine, disoybean amine, ditallow amine, hydrogenated ditallow amine, N-methyloctylamine, N-methyldodecylamine, N-methylhexadecylamine, N-ethyloctylamine, N-ethyloctadecylamine, N-propyldodecylamine, N-butyloctylamine, and the like.

(3) Long-chain tertiary amines having at least an alkyl or alkylene substituent containing from 8 to 36 carbon atoms, e.g. (a) long chain tertiary amines represented by the formula

in which R contains 8 to 36 carbon atoms, R' contains 1 to 36 carbon atoms and R'' contains 1 to 36 carbon atoms and includes but is not limited to trioctyl amine, tridodecyl amine, tristearyl amine, octyldimethyl amine, diocytl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and (b) long chain cyclic tertiary amines including but not limited to N-coco morpholine, N-soya morpholine, N-tallow morpholine and the like.

(4) Long-chain diamines and polyamines having at least one alkyl or alkylene substituent containing from 8 to 36 carbon atoms including, but not limited to, the diamines represented by the formula $RNH(CH_2)_xNH_2$ in which R contains 8 to 36 carbon atoms and $x$ is an integer from 1 to 18, as for example N-coco-trimethylene diamine, N-soya trimethylene diamine, N-tallow trimethylene diamine, N-oleyl trimethylene diamine, N-octyl dimethylene diamine, N-octyl tetramethylene diamine, and the above diamines with one or more amine hydrogens replaced by a methyl, ethyl, propyl or butyl group, and the like.

(5) Long-chain polyethoxylated and polyproxylated secondary and tertiary amines containing at least one alkyl or alkylene substituent having from 8 to 36 carbon atoms e.g. the polyalkoxylated amines represented by the formulas

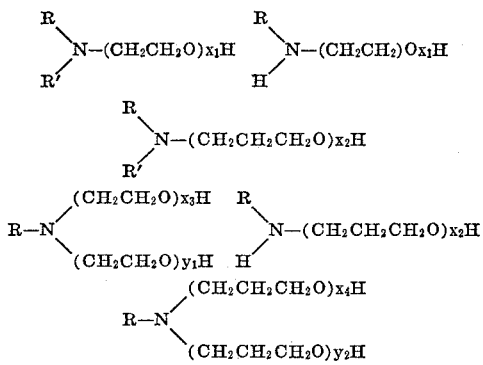

in which R contains 8 to 36 carbon atoms and R' contains 1 to 36 carbon atoms and $x_1$, $x_2$, $x_3$, $x_4$, $y_1$, $y_2$ are each integers between 1 and 30, and include but are not limited to coco amine, soybean amine, tallow amine and stearyl amine each reacted with a plurality, e.g., 2, 5, 10 or 15, moles of ethylene oxide or propylene oxide per mole of amine; and the like;

(6) Long-chain polyethoxylated and polypropoxyldated diamines having at least a single alkyl or alkylene substituent having from 8 to 36 carbon atoms e.g. the diamines represented by the formulas

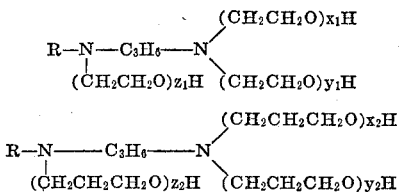

in which R contains 8 to 36 carbon atoms and $x_1$, $x_2$, $y_1$, $y_2$, $z_1$ and $z_2$ are each integers between 1 and 30, which include, but are not limited to, the reaction products of N-coco trimethylene diamine, N-soya trimethylene diamine and N-tallow trimethylene diamine each with a plurality, e.g. 3, 10 or 20 moles of ethylene oxide or propylene oxide per mole of amine, and the like.

The group (A)(ii) carboxylic acids are exemplified as follows: the 8–22 carbon atom carboxylic acids which include, but are not limited to, caprylic, capric, lauric, myristic, mixed coco fatty acids, palmitic, and stearic acids, oleic, palm oil fatty acids, cottonseed oil fatty acids, distilled animal fatty acids, corn oil fatty acids, soya fatty acids, tall oil fatty acids, the rosin acids, abietic acid, the disproportionated rosin acids, hydroabietic acid, dehydroabietic acid, the naphthenic acids, the dimer acids derived from bodied soya bean oil, the trimer acids derived from bodied linseed oil, the fatty acids derived from fish oil and the fish oil polymer acids, the castor oil fatty acids, the unsaturated drying oil fatty acids and the partially and totally hydrogenated acids derived therefrom, synthetic fatty acids, and fatty acids with polar substituents and having at least 8 carbon atoms.

The Group (B)(i) amines are exemplified as follows: n-amylamine, the hexylamines, the heptylamines, ethylene diamine, the propylene diamines, e.g. 1,3-diaminopropane, the butylene, pentylene, hexylene and heptylene diamines, the ethylene and propylene substituted ethylene diamines and propylene diamine and polymers of these e.g. diethylene diamine, triethylene diamine, tetraethylene triamine, pentaethylene tetramine, hexaethylene pentamine, octaethylene heptamine and the like; monoethanolamine, diethanolamine, triethanolamine, the propanolamines, the dipropanolamines, the tripropanolamines, the hydroxy $C_4$ amines, the hydroxy $C_5$ amines, the hydroxy $C_6$ amines, the hydroxy $C_7$ amines and similar diamines and triamines having hydroxyl groups; morpholine and the substituted morpholines in which the substituents in the 4, 2 and 6 position of the morpholine may be one or more methyl, ethyl, propyl and the like alkyl groups, hydroxyl groups or amine groups, and other amines having boiling points over 100° C. at atmospheric pressure and having no carbon chains greater than 7 carbon atoms attached to an amine group.

The group (B)(ii) carboxylic acids are exemplified as follows: acetic, propionic, butyric, valeric, caproic, heptanoic and their isomers, oxalic, fumaric, adipic, succinic, malonic, glutaric, caproic, suberic, pimelic, hydroxyacetic, lactic, glyceric, 2-hydroxybutanoic, and the like.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticizers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches, e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex–20, –419, –726, –757, –787 (TM), and Califlux TT (TM) and other oils suitable for rubber compounding or the oil extension of synthetic rubber; (d) the coumarone-indene oils and resins, e.g. Cumar Resin RH, –P10, –T (TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125 (TM), Para-Flux, Para Resin 2457 (TM); (h) the hydrocarbon resin-coumarone indene polymers, e.g. Picco resins (TM); (i) the pine tars and pine tar oils, rosin and rosin oils, and tall oil and its derivatives, e.g. PT–101, PT–401, PT–800 (TM); and the like.

EXAMPLES

The following examples will serve to illustrate the invention in more detail:

Silica preparation and Examples 1–25

The aqueous slurry of precipitated silica employed in Examples 1–41 was prepared in a manner similar to Example 9 of U.S. Pat. No. 3,250,594 except that the ratio of 41° Bé commercial sodium silicate $$(Na_2O/(SiO_2)_{3.22})$$

to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound alkali content of about 1.5% by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2'-methylene-bis (4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N-di-o-tolylguanidine | 1.5 |
| Triethanolimine | 1.0 |
| Phthalic anhydride | 0.75 |
| Sulfur | 2.25 |

[1] SBR 1502.
[2] Cumar Resin RH, a trademark product of Allied Chemical Corp.

The compound was aged overnight, re-milled and cured for 45 minutes at 287° F.

The physical test data for the vulcanizate when prepared with the foregoing silica pigment is set forth in Table II hereof.

TABLE II

Silica tested (in vulcanizate) Silica Pigment-II:

| | |
|---|---|
| Hardness (Shore A) | 72 |
| Tensile (p.s.i.) | 3530 |
| Modulus (300%) | 1140 |
| Elong. (percent) | 575 |

In the examples, the elastomer solutions and olephilic amine carboxylate treated silica slurries were blended together, preferably with the aid of high shear mixing.

It has also been found that streams of the elastomer solution, the silica pigment slurry, with or without reactant treatment, can be run concurrently into the mixing vessel while mixing or vigorously stirring and then discharging the mixture into hot or boiling water to yield a coagulum containing essentially all of the silica pigment, leaving essentially no silica pigment in the aqueous phase. Thus the processes of the examples are adaptable for either continuous or batch production of the masterbatch. In those instances in which an oil-rubber-silica pigment masterbatch or carbon black-silica pigment masterbatch is desired the processing oil can be added to the polymer solution and the carbon black to the wet silica then both combined with the aid of high shear stirring.

In the treatment of the wet silica pigment prior to masterbatching with the elastomer solution, any soluble aluminium salt may be substituted for the hydrated aluminum sulfate, e.g. aluminum ammonium sulfate or aluminum sodium sulfate, and minor amounts of ammonia may be employed as hereinafter exemplified, without detriment to the process.

TABLE III.—SOLUTION POLYMER-TREATED SILICA MASTERBATCH

[Parts by weight unless otherwise specified]

| | Example | | | |
|---|---|---|---|---|
| | 1 | 2 | 3 | 4 |
| (A) Preparation of acidic, neutrant and alkaline silica pigment/oleophilic amine carboxylate composition: | | | | |
| (a) Silica pigment slurry: | | | | |
| Alkaline silica pigment-I (pH 8.5) 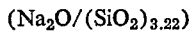 | 150 | 150 | 150 | 150 |
| Dry solids basis | 15 | 15 | 15 | 15 |
| Water | 50 | 50 | 50 | |
| (b) Reagent aqueous solution: | | | | |
| 2% aluminum sulfate [1] | 55 | | | |
| 2% zinc sulfate | | 45 | | |
| 2% sulfuric acid | | | 25.5 | |
| Silica slurry pH | 5.0 | 6.5 | 7.0 | 8.5 |
| (c) Treated silica pigment: | | | | |
| Filtered (X) | X | X | X | X |
| Filter cake | 120 | 128 | 134 | 154 |
| (d) Oleophilic aminecarboxylate treatment and solvent: | | | | |
| Duomeen O-monooleate [2] | 0.9 | | | |
| Duomeen T-dioleate [3] | | 1.5 | | |
| Armeen T-oleate [4] | | | 1.5 | |
| Armeen C-stearate [5] | | | | 1.5 |
| Benzene | 6.7 | 8.5 | 12 | 10.5 |
| (e) Blending (c) and (d): Blender, [6] min | 0.5 | 0.5 | 0.5 | 0.5 |
| (B) Polymer solution: | | | | |
| (a) Polymer: | | | | |
| Isobutyleneisoprene [7] | 30 | 30 | | |
| Ethylene-propylene terpolymer [8] | | | 30 | 30 |
| (b) Solvent: | | | | |
| Benzene | | | 270 | 270 |
| Hexane | 132 | 132 | | |
| Antioxidant [9] | 0.6 | 0.6 | 0.6 | 0.6 |
| (c) Solvation conditions: | | | | |
| Temp., ° C | 60 | 60 | 60 | 60 |
| Time agitated, hrs | 12 | 12 | 12 | 12 |
| (C) Blending (A) plus (B): Blender, [6] min | 0.5 | 0.5 | 0.5 | 0.5 |

See footnotes at end of table.

TABLE III—Continued

| | Example | | | |
|---|---|---|---|---|
| | 1 | 2 | 3 | 4 |
| (D) Solvent removal:[10] | | | | |
| Boiling water (X) | X | X | X | X |
| Silica separation into water phase | None | None | None | None |
| (E) Masterbatch: Dried (105° C.) (X) | X | X | X | X |

[1] Aluminum sulfate $Al_2(SO_4)_3 \cdot 14H_2O$.
[2] Duomeen O-oleate, a trademark product, N-oleic trimethylene diamine monooleate.
[3] Duomeen T DO, a trademark product, N-tallow trimethylene diamine dioleate.
[4] Armeen TO, a trademark product, tallow-amine oleate.
[5] Armeen CT, a trademark product, coco amine stearate.
[6] Waring blendor, a trademark product.
[7] Butyl rubber (a trademark product).
[8] Nordel 1320 (a trademark product), a terpolymer of ethylene, propylene and a non-conjugated diene.
[9] The antioxidant is 2,2'-methylene-bis(4-methyl-6-t-butylphenol).
[10] The treated silica-solvated polymer masterbatch is dropped into boiling water to vaporize the solvent and the silica-polymer masterbatch is recovered and dried.

NOTE: In any of Examples 1–4, steps (A)(d) and (A)(e) may be practiced without the use of organic solvent by dissolving the amine component of the salt in water with the aid of mineral acid, adding same to the wet silica pigment in step (A)(e) and then adding the fatty acid component as an alkali metal or ammonium salt in aqueous solution; the resulting oleophilic amine carboxylate depositing on the silica pigment.

TABLE IV.—SOLUTION POLYMER-TREATED SILICA MASTERBATCH
[Parts by weight unless otherwise specified]

| | Example | | | |
|---|---|---|---|---|
| | 5 | 6 | 7 | 8 |
| (A) Preparation of oleophilic amine carboxylate composition: | | | | |
| (a) Silica pigment: | | | | |
| Alkaline silica pigment (pH 9.0) | 150 | 150 | 150 | 150 |
| Dry solids basis | 15 | 15 | 15 | 15 |
| Water | 50 | 50 | 50 | 50 |
| (b) Reagent-aqueous solution: | | | | |
| 2% aluminum sulfate[1] | 55 | | | 28 |
| 2% sulfuric acid | | 25.5 | 25.5 | 13 |
| Silica slurry pH | 5.0 | 7.0 | 7.0 | 4.0 |
| (c) Treated silica pigment: filtered (X) | X | X | X | X |
| (d) Oleophilic amine carboxylate-aqueous solution: | | | | |
| 10% coco amine acetate | 3.0 | 5.0 | | |
| 10% octadecyl amine acetate | | | 7.5 | 15.0 |
| (e) Blending (c) and (d): Blending,[2] min | 0.5 | 0.5 | 0.5 | 0.5 |
| (B) Polymer solution: | | | | |
| (a) Polymer: | | | | |
| Isobutylene-isoprene[3] | 30 | 30 | | |
| Butadiene-styrene[4] | | | 30 | |
| Ethylene-propylene terpolymer[5] | | | | 30 |
| (b) Solvent: | | | | |
| Hexane | 132 | 270 | 270 | 270 |
| Benzene | 60 | 60 | 60 | 60 |
| Antioxidant[6] | 0.6 | 0.6 | 0.6 | 0.6 |
| (c) Solvation conditions: | | | | |
| Temp., ° C | 60 | 60 | 60 | 60 |
| Time agitated, hrs | 12 | 12 | 12 | 12 |
| (C) Blending (A) plus (B): Blender, min.[7] | 1 | 1 | 1 | 1 |
| (D) Solvent removal:[8] | | | | |
| Boiling water (X) | X | X | X | X |
| Silica separation into water phase | None | None | None | None |
| (E) Masterbatch: Dried 105° C. (X) | X | X | X | X |

[1] Aluminum sulfate $Al_2(SO_4)_3 \cdot 14H_2O$.
[2] Waring Blendor, a trademark product.
[3] Butyl rubber (a trademark product).
[4] Solprene 300 (a trademark product), a normal viscosity, non-staining, solution polymerized random 75/25 copolymer of butadiene and styrene.
[5] Nordel 1320 (a trademark product), a terpolymer of ethylene, propylene and a non-conjugated diene.
[6] The antioxidant is 2,2-methylene-bis-4-(methyl-6-t.-butylphenol).
[7] Waring Blendor (a trademark product).
[8] The silica-solvated polymer masterbatch is dropped into boiling water to vaporize the solvent and the polymer-silica masterbatch is recovered and dried.

TABLE V.—SOLUTION POLYMER-TREATED SILICA MASTERBATCH
[Parts by weight unless otherwise specified]

| | Example | | | |
|---|---|---|---|---|
| | 9 | 10 | 11 | 12 |
| (A) Silica pigment-treated: | | | | |
| (a) Silica pigment slurry: | | | | |
| Alkaline silica pigment-I (pH 9.5) | 150 | 150 | 150 | 150 |
| Dry solids basis | 15 | 15 | 15 | 15 |
| Water | 50 | | 50 | |
| (b) Reagent-aqueous solution: | | | | |
| 2% aluminum sulfate[1] | 55 | | 55 | |
| Silica slurry pH | 5.0 | 9.5 | 5.0 | 9.5 |
| (c) Silica pigment: | | | | |
| Filtered (X) | X | X | X | X |
| Filter cake | 121 | 120 | 120 | 12 |
| (d) Oleophilic amine carboxylate solution: | | | | |
| Armac C[2] | 0.3 | 0.7 | | |
| Duomac O[3] | | | 1.2 | |
| Duomac T[4] | | | | 1.8 |
| Benzene | | | 3.6 | |
| Water | 0.6 | 7.3 | | 7.2 |
| (e) Blend (c) and (d), min | 0.5 | 0.5 | 0.5 | 0.5 |
| (B) Polymer solution: | | | | |
| (a) Polymer: | | | | |
| Isobutylene-isoprene[5] | 30 | 30 | 30 | |
| Butadiene-styrene[6] | | | | |
| Ethylene-propylene terpolymer[7] | | | | 30 |
| (b) Solvent: | | | | |
| Hexane | 132 | 132 | 132 | |
| Benzene | | | | 270 |
| Antioxidant[8] | 0.6 | 0.6 | 0.6 | 0.6 |
| (c) Solvation conditions: | | | | |
| Temp., ° C | 60 | 60 | 60 | 60 |
| Time agitated, hrs | 12 | 12 | 12 | 12 |
| (C) Blending (A) plus (B): Blender,[9] min | 0.5 | 0.5 | 0.5 | 0.5 |
| (D) Solvent removal:[10] | | | | |
| Boiling water (X) | X | X | X | X |
| Silica separation into water phase | None | None | None | None |
| (E) Masterbatch: Dried (105° C.) (X) | X | X | X | X |

[1] Aluminum sulfate $Al_2(SO_4)_3 \cdot 14H_2O$.
[2] Armac C, a trademark product, coco amine acetate.
[3] Duomac O, a trademark product, oleic 1,3-propylene diamine diacetate.
[4] Duomac T, a trademark product, N-tallow trimethylene diamine diacetate.
[5] Butyl rubber, a trademark product.
[6] Solprene 300 (a trademark product), a normal viscosity, non-staining, solution polymerized random 75/25 copolymer of butadiene and styrene.
[7] Nordel 1320 (a trademark product), a terpolymer of ethylene, propylene and a non-conjugated diene.
[8] The antioxidant is 2,2'-methylene-bis(4-methyl-6-t.-butylphenol).
[9] Waring Blendor, a trademark product.
[10] The silica-solvated polymer masterbatch is dropped into boiling water to vaporize the solvent and the polymer-silica masterbatch is recovered and dried.

TABLE VI.—SILICA-POLYMER MASTERBATCH
[Parts by weight unless otherwise specified]

| | Example | | | |
|---|---|---|---|---|
| | 13 | 14 | 15 | 16 |
| (A) Silica pigment slurry treated amine-carboxylate compounds: | | | | |
| (a) Silica pigment aqueous slurry: | | | | |
| Alkaline silica pigment-I pH 9.8 | 150 | 150 | 150 | 150 |
| Dry solids basis | 15 | 15 | 15 | 15 |
| Water | 50 | 50 | 50 | 50 |
| (b) Reagent aqueous solution: | | | | |
| 2% aluminum sulfate[1] | 55 | | | |
| 2% zinc sulfate | | 45 | | |
| 2% calcium chloride | | | 35 | |
| 2% sulfuric acid | | | | 22.5 |
| Silica slurry pH | 5.0 | 6.5 | 8.0 | 7.0 |
| (c) Treated silica pigment: | | | | |
| Filtered (X) | X | X | X | X |
| Filter cake | 121 | 120 | 120 | 119 |
| (d) Oleophilic amine-carboxylate compound: | | | | |
| 25% diethyltriaminemonooleate[2] | 1.8 | | | |
| 25% diethyltriaminedioleate[2] | | 1.2 | 1.2 | |
| 25% diethyltriaminetrioleate[2] | | | | 1.8 |
| 28% aqueous ammonia | 1.0 | | | |
| (e) Blending (c) and (d): Blender,[3] min | 0.2 | 0.2 | 0.2 | 0.2 |
| (B) Polymer solution: | | | | |
| (a) Polymer: | | | | |
| Isobutylene-isoprene[4] | 30 | 30 | | |
| Butadiene-styrene[5] | | | 30 | |
| Ethylene-propylene terpolymer[5] | | | | 30 |
| (b): | | | | |
| Hexane | 132 | 120 | 120 | 270 |
| Antioxidant[7] | 0.6 | 0.6 | 0.6 | 0.6 |
| (c) Solvation conditions: | | | | |
| Temperature,° C | 60 | 60 | 60 | 60 |
| Time agitated, hours | 12 | 12 | 12 | 12 |
| (C) Blending (A) plus (B): Blender,[3] min | 0.5 | 0.5 | 0.5 | 0.5 |

See footnotes at end of table.

TABLE VI—Continued

|  | Example | | | |
|---|---|---|---|---|
|  | 13 | 14 | 15 | 16 |
| (D) Solvent removal:[8] | | | | |
| Boiling water (X) | X | X | X | X |
| Silica separation into serum | None | None | None | None |
| (E) Masterbatch: Dried (105° C.) (X) | X | X | X | X |

[1] Aluminum sulfate Al$_2$(SO$_4$)$_3$·14H$_2$O.
[2] Dissolved in benzene.
[3] Waring Blendor, a trademark product.
[4] Butyl rubber 268, a trademark product.
[5] Solprene 1206, a trademark product, low viscosity, non-staining, solution polymerized random 75/25 copolymer of butadiene and styrene.
[6] Nordel 1320, a trademark product, a terpolymer of ethylene, propylene and a non-conjugated diene.
[7] Antioxidant 2246, a trademark product, 2,2'-methylene-bis-(4-methyl-6-t.-butylphenol).
[8] The silica-solvated polymer masterbatch is dropped into boiling water to vaporize the solvent and the silica polymer masterbatch is recovered and dried.

Example 17

In the Waring Blendor, the 1440 gram portion of the untreated filter cake was mechanically fractured at high speed setting for 10 minutes and 58 ml. of 10% sulfuric acid was then added, resulting in a serum pH of 4.0. Ten (10) grams of octadecylamine acetate was mixed with the silica slurry and 370 grams dry basis of butyl rubber solution.

The butyl rubber solution was prepared by dissolving 370 grams of sheeted out butyl rubber (Thiokol Type 165) and 6500 grams of methylene chloride and 5 grams of antioxidant 2,2' - methylene bis(4-methyl-6-t.-butyl-phenol) and homogenizing the same for 3 minutes in the Waring Blendor at high speed setting. To recover the masterbatch the wet silica pigment slurry rubber-solvent blend was run into 3 liters of boiling water which flashed off the methylene chloride for recovery, and resulting wet masterbatch coagulum was removed from the essentially silica-free serum and dried.

In the foregoing example the butyl rubber solution may be replaced by solutions of other elastomers in suitable solvents, especially hydrocarbon elastomers prepared in solvents such as ethylene-propylene terpolymers, polyisoprene, polybutadiene, butadiene-styrene copolymers, etc.

Examples 18–25

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer latex and silica pigment slurry prior to the coagulation thereof by the aqueous coagulant as set forth in the drawing. Such combinations may be effected in any suitable way, e.g. the carbon black may be added as an aqueous slurry and the processing oil as an aqueous dispersion preferably with the anionic emulsifying agent and/or ammonium hydroxide.

TABLE VII.—SILICA-POLYMER MASTERBATCH INCLUDING CARBON BLACK AND PROCESSING OIL
[Parts by weight unless otherwise specified]

|  | Example | | | |
|---|---|---|---|---|
|  | 18 | 19 | 20 | 21 |
| (A) Silica pigment slurry: | | | | |
| Alkaline silica pigment pH=8.5-9.5 | 25 | 25 | 25 | 25 |
| Dry solids basis | 2.5 | 2.5 | 2.5 | 2.5 |
| Water | 40 | 40 | 40 | 40 |
| (B) Reagent-aqueous solution: 2% aluminum sulfate[1] | 8.5 | 8.5 | | |
| (C) Combine (A) and (B): | | | | |
| Blend, (X) | X | X | X | X |
| Filter, (X) | X | X | X | X |

See footnotes at end of table.

TABLE VII—Continued

|  | Example | | | |
|---|---|---|---|---|
|  | 18 | 19 | 20 | 21 |
| (D) Oleophilic amine carboxylate: | | | | |
| Tallow amine acetate[2] | 0.25 | 0.25 | | |
| Coco amine acetate[3] | | | 0.20 | 0.20 |
| Water | 10 | 10 | 10 | 10 |
| (E) Combine (C) and (D): Blend,[4] min | 0.5 | 0.5 | 0.5 | 0.5 |
| (F) Carbon black: | | | | |
| Philblack O[5] | 5 | 5 | | |
| Statex 160 HR | | | 5 | 5 |
| Sundex 2XH[6] | 1 | | | |
| (G) Combine (E) and (F): Blend,[4] min | 0.5 | 0.5 | 0.5 | 0.5 |
| (H) Polymer solution: | | | | |
| 18.5% isobutylene-isoprene in hexane[7] | 81 | | | |
| 10% butadiene-styrene in hexane[8] | | 150 | | |
| 10% ethylene-propylene terpolymer in benzene[9] | | | 150 | |
| 10% butadiene-styrene in hexane[10] | | | | 150 |
| Dry solids basis | 15 | 15 | 15 | 15 |
| Antioxidant[11] | 0.3 | 0.3 | 0.3 | 0.3 |
| (I) Combine (G) and (H): Blend,[4] min | 0.5 | 0.5 | 0.5 | 0.5 |
| (J) Solvent removal:[12] | | | | |
| Boiling water (X) | X | X | X | X |
| Silica and/or carbon black in serum | None | None | None | None |
| (K) Masterbatch: Dried (105° C.) (X) | X | X | X | X |

[1] Aluminum sulfate Al$_2$(SO$_4$)$_3$·14H$_2$O.
[2] Armac T, a trademark product.
[3] Armac C, a trademark product.
[4] Waring Blendor, a trademark product.
[5] Carbon black, a trademark product.
[6] Processing oil, a trademark product.
[7] Butyl rubber 268, a trademark product.
[8] Solprene 300, a trademark product, a normal viscosity, non-staining, solution polymerized random 75/25 copolymer of butadiene and styrene.
[9] Nordel 1320, a trademark product, a terpolymer of ethylene, propylene and a non-conjugated diene.
[10] SBR–1502.
[11] Antioxidant 2246, a trademark product, is 2,2'-methylene-bis-(4-methyl-6-t.-butylphenol).
[12] The silica-carbon black-solvated polymer masterbatch is dropped into boiling water to vaporize the solvent and the silica-carbon black-polymer masterbatch is recovered and dried.

TABLE VIII.—SILICA-POLYMER MASTERBATCH INCLUDING CARBON BLACK
[Parts by weight unless otherwise specified]

|  | Example | | | |
|---|---|---|---|---|
|  | 22 | 23 | 24 | 25 |
| (A) Silica pigment slurry: | | | | |
| Alkaline silica pigment-I pH=8.5-9.5 | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% sulfuric acid | 4.5 | 4.5 | | |
| 2% calcium chloride | | | 5.0 | 5.0 |
| (C) Combine (A) and (B): | | | | |
| Blend, (X) | X | X | X | X |
| Filter, (X) | X | X | X | X |
| (D) Oleophilic amine carboxylate: | | | | |
| Triethanolamine stearate | 0.33 | 0.33 | | |
| Tallow 1,3-propylene diamine acetate[1] | | | 0.2 | 0.2 |
| Water | 5 | 5 | 5 | 5 |
| (E) Carbon black: | | | | |
| Statex 160 HR[2] | 5 | 5 | | |
| Thermax[2] | | | 5 | 5 |
| (F) Combine (C) and (D) then (E): Blend,[3] min | 0.5 | 0.5 | 0.5 | 0.5 |
| (G) Polymer solution: | | | | |
| 20% Butadiene-styrene in benzene[4] | 75 | | | |
| 18.5% isobutylene-isoprene in hexane[5] | | 81 | 81 | |
| 10% butadiene-styrene in hexane[6] | | | | 150 |
| Dry solids basis | 15 | 15 | 15 | 15 |
| Antioxidant[7] | 0.3 | 0.3 | 0.3 | 0.3 |
| Benzene | 75 | 40 | 40 | |
| (H) Combine (F) and (G): Blend,[1] min | 0.5 | 0.5 | 0.5 | 0.5 |
| (I) Solvent removal:[8] | | | | |
| Boiling water (X) | X | X | X | X |
| Silica and/or carbon black in serum | None | None | None | None |
| (J) Masterbatch: Dried (105° C.) (X) | X | X | X | X |

[1] Duomac T, a trademark product.
[2] Carbon black, a trademark product.
[3] Waring Blendor, a trademark product.
[4] Solprene 1206, a trademark product, a low viscosity, solution polymerized random 75/25 copolymer of butadiene and styrene.
[5] Butyl rubber 268, a trademark product.
[6] Solprene 300, a trademark product, a normal viscosity, non-staining, solution polymerized random 75/25 copolymer of butadiene and styrene.
[7] Antioxidant is 2,2'-methylene-bis-(4-methyl-6-t.-butylphenol).
[8] The silica-carbon black-solvated polymer masterbatch is dropped into boiling water to vaporize the solvent and the silica-carbon black-polymer masterbatch is recovered and dried.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatibility of the said pigments with elastomer materials in general.

In certain co-pending applications filed concurrently herewith, different modes of improving elastomer-silica pigment masterbatches are provided by employing elastomers supplied with certain substituent groups improving the compatibility of the elastomers with the aqueously wet silica pigments.

To maintain clear lines of division between the co-pending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
    (a) aqueously wet hydrated silica pigment, and
    (b) an elastomer;

which process comprises the steps of:

(c) providing an organic solvent dispersion of the elastomer containing (1) 100 parts of the elastomer by weight, and (2) the solvent of which is essentially water immiscible;

(d) providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide; which has been filtered and washed; and which has continuously been maintained in an aqueous phase without having been dried after its precipitation;

(e) providing a quantity of from 0.1 to 20% by weight, based on the silica pigment referred to in step (d), of oleophilic amine carboxylate material selected from the group consisting of neutral, basic and acidic carboxylic acid salts of amines;

(f) providing when used in step (g) reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of two or more members selected from Groups (I), (II) and (III);

(g) combining the wet silica pigment provided by step (d) with reactant material provided in step (f) in an amount in the range of from 0 to at least about a stoichiometric equivalent of the alkalinity of the said pigment;

(h) combining the wet silica pigment provided by step (g) with the oleophilic amine carboxylate material provided by step (e), thereby providing a wet silica pigment for use in step (i);

(i) intimately mixing the solvent dispersion of elastomer provided by step (c) with (1) the treated silica pigment slurry prepared by step (h), (2) from 0 to 75 parts by weight of carbon black with the limitation that the total of silica pigment and carbon black, dry basis, not exceed 80 parts by weight and (3) from 0 to 45 parts by weight of processing oil, and (j) removing the solvent and aqueous phase and recovering the resulting combination as a masterbatch, whereby there is formed a master batch containing essentially all of the silica pigment employed in step (g).

2. A process as claimed in claim 1, in which the solvent employed in step (c) itself or as an aqueous azeotrope has a boiling point lower than that of water at atmospheric pressure, and in which step (j) is effected by volatilizing solvent from the intimate mixture to convert said mixture to coagulum and aqueous serum, and then separating the coagulum from the serum as a masterbatch.

3. A process as claimed in claim 1, wherein the reactant is employed in step (g) in about said stoichiometric equivalent amount.

4. A process as claimed in claim 1, in which the elastomer consists essentially of polymer prepared by essentially anhydrous polymerization.

5. A process as claimed in claim 4, in which at least 5 parts by weight of carbon black are employed in step (i).

6. A process as claimed in claim 4, in which at least 5 parts by weight of processing oil are employed in step (i).

References Cited

UNITED STATES PATENTS

| | | | |
|---|---|---|---|
| 2,047,128 | 7/1936 | Park | 106—308 N |
| 2,383,653 | 8/1945 | Kirk | 106—308 N |
| 2,635,057 | 4/1953 | Jordan | 106—308 N |
| 2,821,232 | 1/1958 | Wolf | 152—330 |
| 2,982,665 | 5/1961 | Wilcox | 106—308 N |
| 3,081,276 | 3/1963 | Synder | 260—33.6 |
| 3,172,726 | 3/1965 | Burke et al. | 23—182 |
| 3,244,660 | 4/1966 | Herold | 260—29.7 |
| 3,250,594 | 5/1966 | Burke et al. | 23—182 |

MORRIS LIEBMAN, Primary Examiner

J. H. DERRINGTON, Assistant Examiner

U.S. Cl. X.R.

106—308 F, 308 N; 260—41.5 R, 41.5 A, 41.5 MP